United States Patent [19]

Yee et al.

[11] Patent Number: 5,497,287
[45] Date of Patent: Mar. 5, 1996

[54] ELECTRICAL PORT SAFETY GUARD MECHANISM

[75] Inventors: Edgar Yee, Chapel Hill, N.C.; Richard G. DeTuccio, Milwaukee, Wis.; Kevin F. Nolan, Hillsborough; Lloyd E. Wentler, Efland, both of N.C.

[73] Assignee: General Electric Company, New York, N.Y.

[21] Appl. No.: 401,646

[22] Filed: Mar. 10, 1995

Related U.S. Application Data

[63] Continuation of Ser. No. 339,661, Nov. 14, 1994, abandoned.

[51] Int. Cl.$^6$ ............................................. H02B 1/14
[52] U.S. Cl. .................................. 361/617; 439/145
[58] Field of Search ........................... 200/50 R, 50 AA, 200/304; 439/137–145; 174/67; 361/605, 607, 609, 611, 615, 617, 659, 660

[56] References Cited

U.S. PATENT DOCUMENTS

| | | | |
|---|---|---|---|
| 3,610,850 | 10/1971 | Eichelberger | 200/50 AA |
| 3,896,353 | 7/1975 | Burton | 361/609 |
| 3,920,939 | 11/1975 | Ciboldi | 200/50 AA |
| 4,146,915 | 3/1979 | Yosida et al. | |
| 4,443,676 | 4/1984 | Castonguay | 200/304 |
| 4,447,682 | 5/1984 | Castonguay | 361/617 |
| 4,486,815 | 12/1984 | Takahashi et al. | |
| 4,565,908 | 1/1986 | Bould | 200/50 AA |
| 4,672,501 | 6/1987 | Bilac et al. | |
| 4,688,144 | 8/1987 | Kleinecke et al. | |
| 4,713,501 | 12/1987 | Herrmann | 200/50 AA |

FOREIGN PATENT DOCUMENTS

| | | | |
|---|---|---|---|
| 858157A | 8/1981 | U.S.S.R. | 361/617 |

Primary Examiner—Gerald P. Tolin
Attorney, Agent, or Firm—Richard A. Menelly

[57] ABSTRACT

An electrical port safety guard mechanism in the form of a shutter assembly is positioned between the vertical power bus conductors in an electric motor control center and the electric components contained therein. The shutter assembly allows access to the busbar conductors when the electrical components are inserted within the motor control center and prevents electrical access to the busbar conductors when the electrical components are removed therefrom.

7 Claims, 5 Drawing Sheets

ELECTRICAL PORT SAFETY GUARD MECHANISM

This Application is a Continuation of Applicants' application, Ser. No. 08/339,661 filed Nov. 14, 1994, now abandoned.

BACKGROUND OF THE INVENTION

Motor control centers such as described within U.S. patent application Ser. No. 08/339,899 filed Nov. 14, 1994 entitled "Modular Motor Control Center" contain electrical components that are use to start and control electric motors within an industrial environment. The components are situated within separate compartments within the control center and are occasionally accessed for replacement and repair. To prevent contact with the electrical supply busbar conductors situated at the rear of the control center, electrical shutter devices are often inserted within the compartments intermediate the electrical components and the energized busbar conductors. Examples of state-of-the-art electrical shutter devices are found within U.S. Pat. Nos. 4,146,915; 4,486,815 and 4,688,144.

As described within the aforementioned U.S. patent application, a Motor Control Center distributes three phase electric power to motor starter components contained within the. Each phase of the electric power is fed to the motor starter components by one of three vertical busbar conductors inserted therein. The vertical busbar conductors are made of copper and are electrically isolated from the interior of the by means of a polyester shield. When an electrical component is placed into the control center, the electrical stabs extending from the rear of the component become inserted through coincident holes in the shield into electrical contact with the busbar conductors.

As described within the aforementioned U.S. Patents, various shutter assemblies are available for insertion within the control center to prevent inadvertent contact with the busbar conductors when the electrical components are absent from their respective compartments. Since several electrical components are required with most control centers, such shutter assemblies are generally used with corresponding electrical components which are anticipated to require replacement, adjustment or repair in order to minimize the costs involved in obtaining and installing the shutter assemblies.

One purpose of the invention is to describe a simple and economically feasible shutter assembly that allows the use of one such assembly with each of the electrical components.

DESCRIPTION OF THE PREFERRED EMBODIMENT

Figure 1:
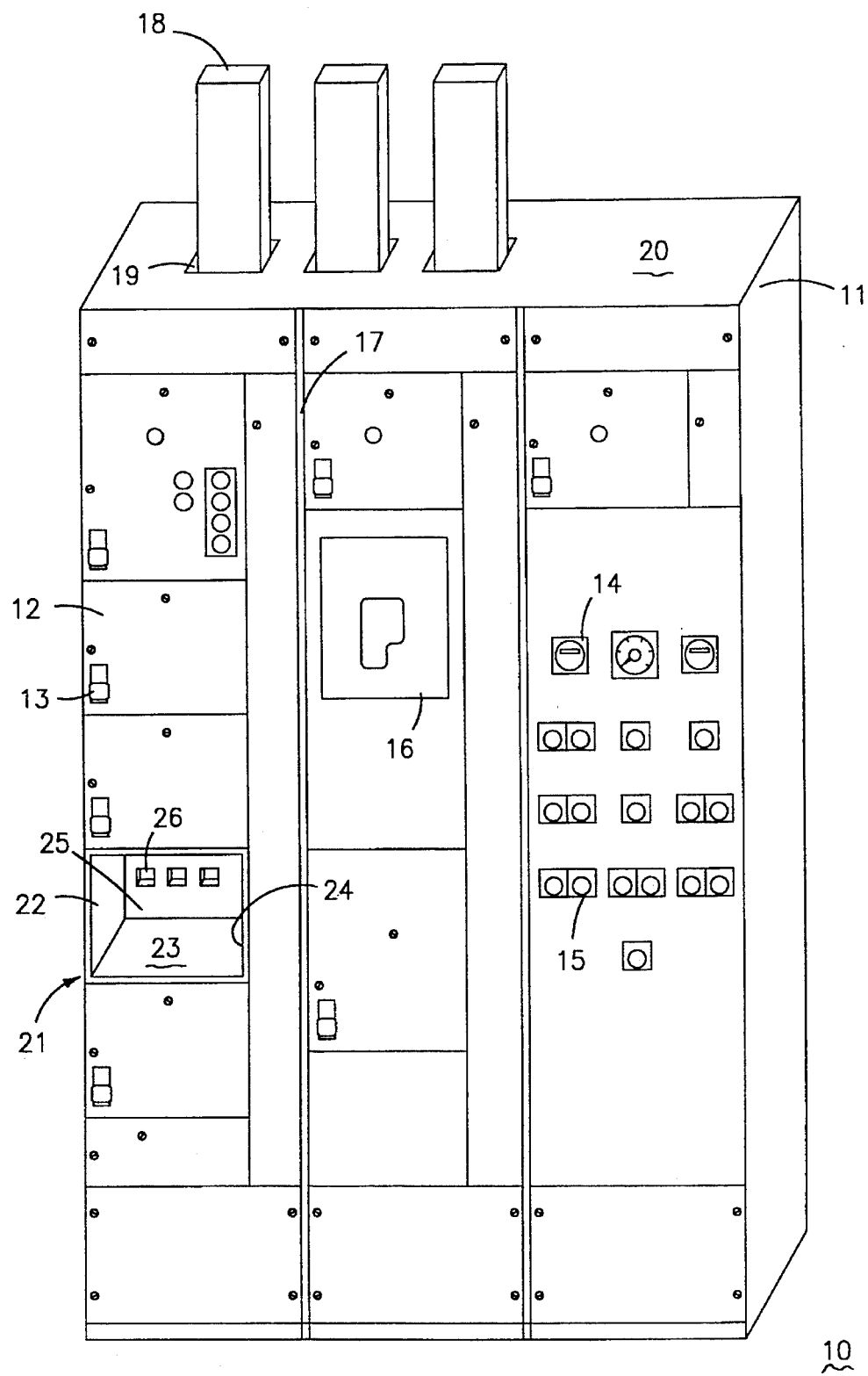
FIG. 1 is a front perspective view of a motor control center capable of accepting the shutter assembly in accordance with the invention.

A standard motor control center 10, as shown in FIG. 1, consists of a metallic enclosure 11 that houses a plurality of various-sized compartments 12. To externally access the electrical components such as circuit breakers, contactors and transformers contained within the compartments, one of which is indicated at 21, corresponding handle operators 13 are arranged through each of the individual compartments. Meters 14 along with indicator lamps 15 provide indication of the electrical state of the various components without requiring access to the interior of the enclosure. A control unit 16, such as described within U.S. Pat. No. 4,672,501 entitled "Circuit Interrupter and Control Unit" is used to provide both control as well as communication function between the internal electrical components and the external electrical distribution system that includes the corresponding electric motors. One of the compartments is removed from the enclosure to indicate the interior sidewalls 22, 24 the bottom shelf 23. The insulating barrier 25 described earlier as isolating the busbar conductors 18 that enter the top 20 of the enclosure 11 by means of slots 19, further includes spaced openings 26 to provide electric connection with the electrical component that is inserted therein.

Figure 2:
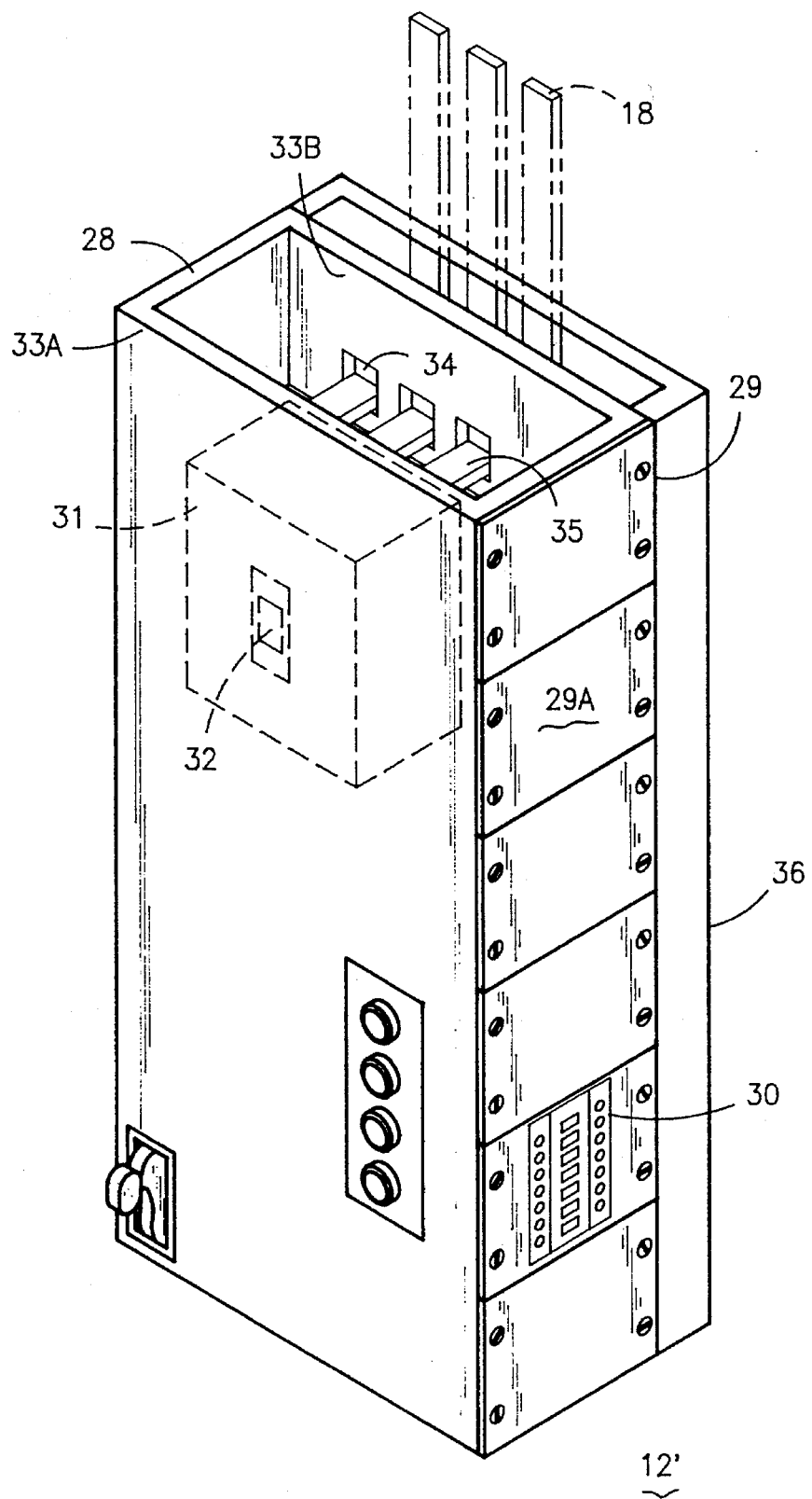
FIG. 2 is a top perspective view of an electrical components compartment within the motor control center of FIG. 1.
Figure 3:
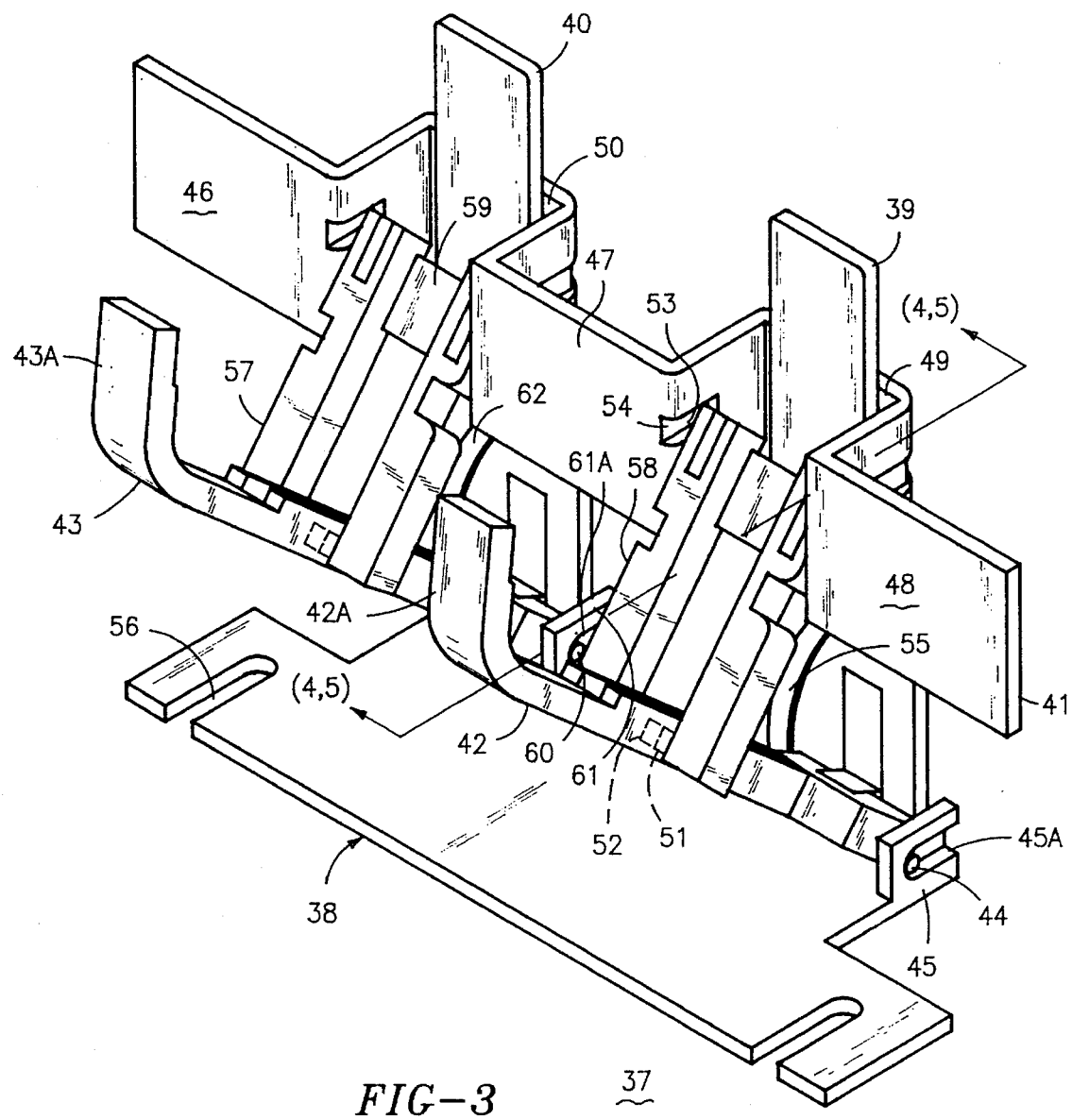
FIG. 3 is an enlarged top perspective view of the shutter assembly used with the motor control center of FIG. 1.

One such component is the circuit breaker 31 which includes an ON-OFF handle 32 extending from a front surface within the compartment 12 as seen in FIG. 2. The compartment includes a metal front wall 33A and a similar backwall 33B joined by opposing side walls 28, 29. Side wall 29 is formed from a modular array of filler plates 29A as described in the aforementioned U.S. patent application Ser. No. 08/339,899 and includes a terminal strip 30 for terminal connection with the electrical components contained therein. The circuit breaker stabs 35 extending from the rear of the circuit breaker further extend through openings 34 formed in the back wall 33B and through the openings 26 in the electrically-insulating barrier 36 into contact with the vertical busbars 18 shown in FIG. 1, the shutter assembly 37 shown in FIG. 3 is inserted within the compartment 21 to prevent inadvertent contact with the busbars when the compartment 12 is absent from the compartment 21.

The shutter assembly 37 includes a slide unit 38, formed from a single molded plastic piece that includes a pair of upstanding plates 39,40. A separate pair of levers 42,43 also formed from molded plastic, extend from the slide unit and are attached thereto by means of pivot posts 44 that snappingly engage the slots 45A formed within the slide unit sidearms 45 as shown for the lever 42. A similar arrangement of pivot posts 60, sidearms 61 and slots 61A are used to pivotally support the lever 43. The shutter 41 is slidably arranged on the plates 39, 40 by means of the off-set regions 49,50 and are supported therein by means of a pair of hinges 57,58. Attachment between the hinges and the levers 42,43 is by means of posts formed on the ends of the hinges engaging slots 52 formed within the levers, as indicated. Attachment between the hinges and the shutter 41 is by means of the posts 53 at the ends of the hinges and the slots 54 formed within the off-set regions 49,50 of the shutter. When the curved ends 42A, 43A of the levers 42,43 are contacted in the manner to be described below, the levers rotate clockwise about the pivot posts 44,60 against the return springs 55, 62 and drive the shutter 41 in the indicated direction by virtue of the connection between the shutter and the levers 42,43. The blocking plates 46–48 on the shutter then move out of blocking relation with openings 26 in the insulating barrier 36 as best seen by now referring jointly to FIGS. 3–5.

Figure 4:
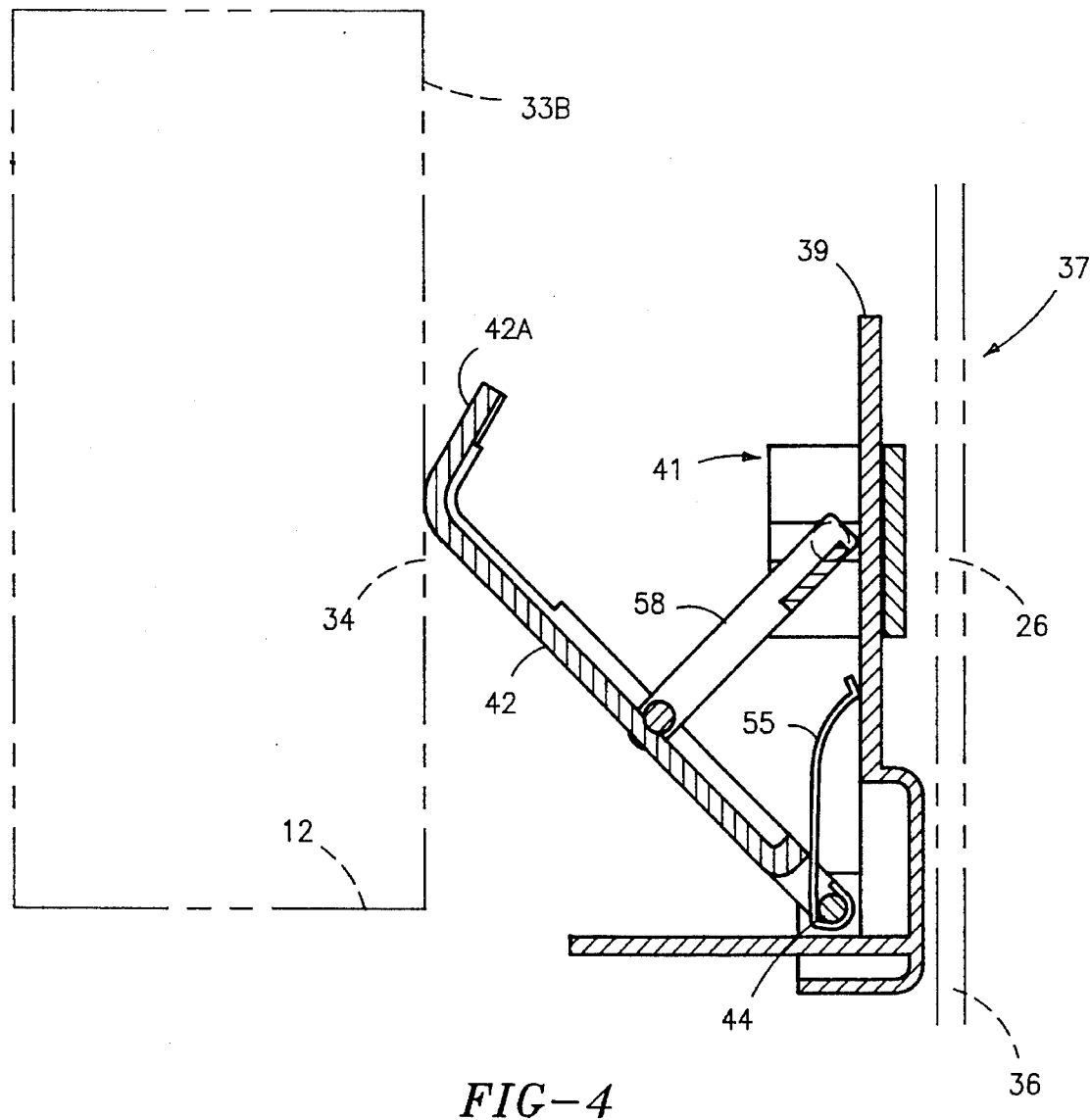
FIG. 4 is an enlarged side sectional view of the shutter assembly of FIG. 3 positioned within the motor control center of FIG. 1 in a CLOSED condition.
Figure 5:
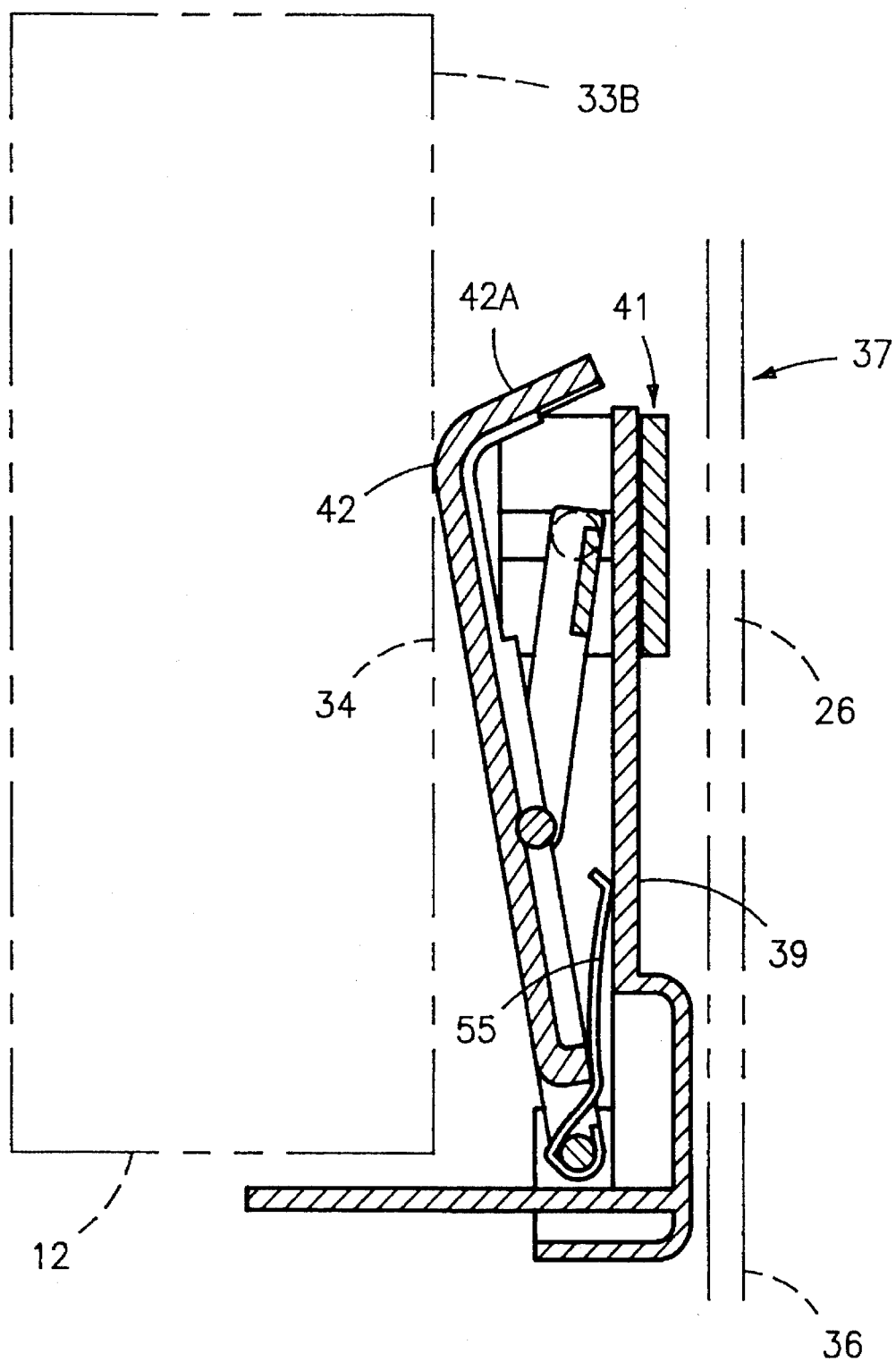
FIG. 5 an enlarged side sectional view of the shutter assembly of FIG. 3 positioned within the motor control center of FIG. 1 in an OPENED condition.

In FIG. 4, the back wall 33B of the compartment 12, shown in phantom, is away from the curved end 42A of the lever 42 so that the openings 34 in the backwall 33B in alignment with the openings 26 in the insulating barrier 36, also shown in phantom, are blocked by interference of the shutter 41 as carried by the hinge 58 and held in position by the bias of the return spring 55 against the up-standing plate 39. When the compartment 12 is motivated in the indicated direction, the curved end 42A is driven to the position shown in FIG. 5 with the shutter 41 on the shutter assembly 37 above the openings 26 in the insulating barrier 36 so that direct access is achieved between the openings 34 in the backwall 33B and the barrier openings 26 as seen by the indicating arrow. In this position, the return spring 55 is charged against the upstanding plate 39. When the backwall 33B of compartment 12 is later moved away from the lever 42, the shutter assembly 37 returns to the blocking position indicated in FIG. 4 under the bias provided by the return spring 55.

A shutter assembly has herein been described for use within a motor control center containing removable electrical component compartments. Access to the vertical busbars within the rear of the motor control center is prevented by automatic operation of the shutter assembly when any of the compartments are removed from the motor control center.

We claim:

1. A motor control center comprising:

an enclosure 11;

a compartment 12 containing an electrical component 31 within said enclosure;

operating means 13 extending from a front of said enclosure providing external control of said electrical component;

indicating means 14 extending from said front of said enclosure providing indication as to an operating state of said electrical component;

a chamber 21 containing said compartment and allowing electrical access to electrical busbars extending within a rear of said enclosure;

an insulating barrier 25 covering said busbars except for electrical access openings 26;

a shutter assembly 37 within said chamber and arranged for providing electrical access to said busbars when said compartment is within said chamber and preventing electrical access to said busbars when said compartment is outside of said enclosure, said shutter assembly including a slidably-mounted shutter 41 arranged for moving in front of said electrical access openings when said compartment is outside of said enclosure, said shutter assembly includes a slide unit 38 fastened to a bottom shelf 23 within said chamber, said shelf including an up-standing plate 39 integrally-formed therewith, said shutter being supported on said plate said shutter comprises a plurality of blocking plates 46–48 integrally-formed thereon, said plates being arranged in front of said electrical access openings when said compartment is outside of said chamber to thereby prevent electrical access to said busbars;

a lever 42 pivotally-supported on said slide unit and including a top part 42A inclined toward said compartment when said compartment is outside of said chamber; and a hinge 58 attached to said lever at one end and to said shutter at an opposite end, whereby said hinge moves said shutter in unison with said lever, said shutter comprises a plurality of blocking plates 46–48 integrally-formed thereon, said plates being arranged in front of said electrical access openings when said compartment is outside said chamber to thereby prevent electrical access to said busbars, said shutter is formed from a continuos plastic plate, said plate being offset to define an off-set folded region 49, said off-set region capturing and supporting said upstanding plate.

2. The motor control center of claim 1 including a return spring 55 contacting said lever at one end and contacting said up-standing plate at an opposite end thereof, said return spring biasing said lever away from said up-standing plate.

3. The motor control center of claim 1 wherein hinge includes first pivot posts 51 extending from said hinge at said one end, said first pivot posts being captured within corresponding first slots 52 formed within said lever.

4. The motor control center of claim 3 wherein said hinge includes second pivot posts 53 extending from said hinge at said other end, said second pivot posts being captured within corresponding second slots 52 formed within said shutter.

5. A shutter assembly for electric motor control centers comprising:

a slidably-mounted shutter 41 arranged for moving in front of electrical access openings 26 within a motor control center to prevent access to vertical electric busbars 18 within said motor control center when said compartment is outside of said motor control center;

a slide unit 38 fastened to a bottom shelf 23 within said motor control center, said shelf including an up-standing plate 39 integrally-formed therewith, said shutter being supported on said plate;

a lever 42 pivotally-supported on said slide unit and including a top part 42A inclined toward said compartment when said compartment is outside of said motor control center;

a plurality of blocking plates 46–48 integrally-formed thereon said shutter, said plates being arranged in front of said electrical access openings when said compartment is outside said motor control center to thereby prevent electrical access to said busbars; and a return spring 55 contacting said lever at one end and contacting said up-standing plate at an opposite end thereof, said return spring biasing Said lever away from said up-standing plate, said shutter is formed from a continuous plastic plate, said plate being offset to define an off-set folded region 49, said off-set region capturing and supporting said upstanding plate.

6. The shutter assembly for electric motor control centers of claim 5 wherein said hinge includes first pivot posts 51 extending from said hinge at said one end, said first pivot posts being captured within corresponding first slots 52 formed within said lever.

7. The shutter assembly for electric motor control centers of claim 6 wherein said hinge includes second pivot posts 53 extending from said hinge at said other end, said second pivot posts being captured within corresponding second slots 52 formed within said shutter.

* * * * *